(12) United States Patent
Shen (10) Patent No.: US 9,873,621 B2
(45) Date of Patent: Jan. 23, 2018

(54) GROUNDING ASSEMBLY FOR AN ULTRAVIOLET WATER SANITIZER

(71) Applicant: Kui Shen, Guangdong (CN)

(72) Inventor: Kui Shen, Guangdong (CN)

(73) Assignee: Wonder Light Industry Machinery Electronic Products Co., Limited, Wan Chai (HK)

( * ) Notice: Subject to any disclaimer, the term of this patent is extended or adjusted under 35 U.S.C. 154(b) by 124 days.

(21) Appl. No.: 15/072,753

(22) Filed: Mar. 17, 2016

(65) Prior Publication Data

US 2016/0276753 A1    Sep. 22, 2016

(30) Foreign Application Priority Data

Mar. 19, 2015 (CN) .................... 2015 2 0161125 U (51) Int. Cl.
| | |
|---|---|
| H01R 4/66 | (2006.01) |
| C02F 1/32 | (2006.01) |
| H01R 4/34 | (2006.01) |
| H02G 3/22 | (2006.01) |

(52) U.S. Cl.
CPC .............. *C02F 1/325* (2013.01); *H01R 4/34* (2013.01); *C02F 2201/3223* (2013.01); *H02G 3/22* (2013.01)

(58) Field of Classification Search
CPC ...... C02F 1/32; C02F 1/78; C02F 3/00; C02F 2201/3223; H01R 4/34; H01R 13/648
USPC ........................................................ 439/97
See application file for complete search history.

(56) References Cited

U.S. PATENT DOCUMENTS

| | | | | |
|---|---|---|---|---|
| 3,672,823 A | * | 6/1972 | Boucher | A61L 2/025 134/1 |
| 4,012,321 A | * | 3/1977 | Koubek | C02F 1/32 210/748.15 |
| 4,141,830 A | * | 2/1979 | Last | C02F 1/325 210/192 |
| 4,400,270 A | * | 8/1983 | Hillman | A61L 2/10 210/103 |
| 4,482,809 A | * | 11/1984 | Maarschalkerweerd | A61L 2/10 250/435 |
| 4,872,980 A | * | 10/1989 | Maarschalkerweerd | A61L 2/10 210/192 |
| 5,128,043 A | * | 7/1992 | Wildermuth | C02F 1/48 210/223 |
| 5,369,892 A | * | 12/1994 | Dhaemers | D06F 58/10 34/224 |
| 5,460,702 A | * | 10/1995 | Birkbeck | C02F 1/4672 204/269 |
| 5,471,063 A | * | 11/1995 | Hayes | A61L 2/10 210/748.11 |
| 5,582,718 A | * | 12/1996 | Sobczak | C02F 1/50 210/136 |

(Continued)

*Primary Examiner* — Abdullah Riyami
*Assistant Examiner* — Vladimir Imas
(74) *Attorney, Agent, or Firm* — Thomas I. Rozsa (57) ABSTRACT

A grounding assembly for an ultraviolet water sanitizer with a power cable electrically connected to an ultraviolet lamp sanitizer within a metal chamber, a grounding wire portion of the power cable connected by ground connecting member within an interior chamber of a grounding assembly connected to the metal chamber so that the grounding wire is not exposed outside of the water sanitizer.

2 Claims, 5 Drawing Sheets

(56) References Cited

U.S. PATENT DOCUMENTS

| | | | | |
|---|---|---|---|---|
| 5,765,403 A * | 6/1998 | Lincoln | C02F 1/74 | 422/186.12 |
| 5,769,336 A * | 6/1998 | Emmerson | | 241/100 |
| 5,839,155 A * | 11/1998 | Berglund | A47L 7/04 | 15/321 |
| 5,935,431 A * | 8/1999 | Korin | A61L 2/10 | 210/205 |
| 5,942,110 A * | 8/1999 | Norris | C02F 1/325 | 210/198.1 |
| 6,042,730 A * | 3/2000 | Lahti | C02F 1/42 | 210/667 |
| 6,080,313 A * | 6/2000 | Kelada | C02F 9/005 | 210/202 |
| 6,086,760 A * | 7/2000 | Hoffa | A01K 63/04 | 119/264 |
| 6,099,735 A * | 8/2000 | Kelada | B01D 61/08 | 210/134 |
| 6,132,629 A * | 10/2000 | Boley | B01F 3/04985 | 210/167.11 |
| 6,193,894 B1 * | 2/2001 | Hollander | A61L 2/10 | 210/748.11 |
| 6,455,017 B1 * | 9/2002 | Kasting, Jr. | A61L 2/183 | 134/95.3 |
| 6,583,422 B2 * | 6/2003 | Boehme | C02F 1/325 | 250/432 R |
| 6,623,635 B2 * | 9/2003 | Barnes | C02F 1/006 | 210/188 |
| 6,684,648 B2 * | 2/2004 | Faqih | B01D 5/009 | 62/272 |
| 6,733,662 B2 * | 5/2004 | Pollock | C02F 3/1268 | 210/143 |
| 6,881,331 B1 * | 4/2005 | Barnes | B01F 5/0413 | 210/192 |
| 6,927,234 B2 * | 8/2005 | Aoki | A61K 36/48 | 424/185.1 |
| 7,002,161 B2 * | 2/2006 | Greene | C02F 1/008 | 210/94 |
| 7,089,763 B2 * | 8/2006 | Forsberg | E03B 3/28 | 62/285 |
| 7,135,108 B1 * | 11/2006 | Barnes | C02F 1/78 | 210/120 |
| 7,169,311 B2 * | 1/2007 | Saccomanno | A61L 2/10 | 210/198.1 |
| 7,241,380 B2 * | 7/2007 | Reiling | C02F 1/325 | 210/170.08 |
| 7,373,787 B2 * | 5/2008 | Forsberg | E03B 3/28 | 62/272 |
| 7,741,617 B2 * | 6/2010 | Matthews | C02F 1/325 | 210/198.1 |
| 8,061,387 B1 * | 11/2011 | Barnes | B01F 1/0033 | 137/889 |
| 8,414,779 B2 * | 4/2013 | Levy | C02F 1/32 | 210/198.1 |
| 8,603,391 B2 * | 12/2013 | Itzhak | A61L 2/035 | 422/121 |
| 8,685,238 B2 * | 4/2014 | Gunter | C02F 1/325 | 210/141 |
| 8,890,087 B2 * | 11/2014 | Ben-David | C02F 1/325 | 210/748.1 |
| 8,926,842 B2 * | 1/2015 | Shim | C02F 1/325 | 210/205 |
| 9,017,123 B2 * | 4/2015 | Szydlowski | B63B 25/08 | 441/4 |
| 9,023,214 B2 * | 5/2015 | Zolezzi-Garreton | C02F 1/4608 | 204/155 |
| 9,040,012 B2 * | 5/2015 | McAlister | C01B 3/24 | 205/615 |
| 9,079,125 B2 * | 7/2015 | Reilly | B01D 21/0093 | |
| 9,296,610 B1 * | 3/2016 | Greuel | C01B 13/10 | |
| 9,371,114 B2 * | 6/2016 | Szydlowski | H01L 31/042 | |

* cited by examiner

GROUNDING ASSEMBLY FOR AN ULTRAVIOLET WATER SANITIZER

CROSS-REFERENCE TO RELATED APPLICATION

This patent application claims priority to Chinese Patent Application No. 201520161125.2 filed on Mar. 19, 2015, now pending.

BACKGROUND OF THE INVENTION

1. Field of the Invention

The present invention relates to the field of grounding electrical wires. Specifically, this invention relates to the grounding of electrical wires within a stainless steel chamber of an ultraviolet water sanitizer.

2. Description of the Prior Art

The ultraviolet water sanitizer into which the present invention is incorporated uses ultraviolet light to sanitize water when the water to be sanitized passes through a stainless steel chamber having an inlet and an outlet, an ultraviolet lamp within the chamber, a lamp plug, a ballast, a quartz sleeve, an O-ring, a PG water proof strainer, and components of a grounding nut. The quartz sleeve is placed into the stainless steel chamber and the stainless steel chamber is sealed by an O-ring, the quartz sleeve and a component of the grounding nut. The ultraviolet lamp is connected with a lamp plug and then the ultraviolet lamp is placed inside the quartz sleeve. The grounding cable is fixed inside a first component of the grounding nut. A PG waterproof strainer is screwed into a connection point of the grounding cable to seal water.

The ultraviolet water sterilizer must be grounded. In the previously used method, the power cord was grounded by having a grounding nut welded onto the exterior surface of the stainless steel chamber and the grounding portion of the power cable was fixed at the grounding nut. While complying with required safety standards, the previously used method has the following problems:
 1. Polishing and spray painting have to be repeated after the grounding nut is welded onto the exterior surface of the stainless steel chamber.
 2. There may be an increased possibility of water leakage from the stainless steel chamber.

There is a significant need to solve the problems created by the previously used method and apparatus associated with affixing the grounding nut and grounding cable.

SUMMARY OF THE INVENTION

The present invention is a grounding assembly for use with an ultraviolet water sanitizer. This grounding assembly provides a means to attach a grounding wire in a waterproof assembly. The stainless steel chamber has water that passes from one end to another end. While water is passing through this chamber an ultraviolet water sanitizer uses ultraviolet light to sanitize the water.

It is an object of the present invention to have components that include a stainless steel chamber with an inlet and an outlet, ultraviolet lamp, lamp plug, ballast, quartz sleeve, O-ring, PG waterproof strainer, and an innovative grounding nut. In operation, the ultraviolet lamp is connected with a lamp plug and is placed inside the quartz sleeve. The quartz sleeve is then placed inside the stainless steel chamber and is sealed by an O-ring and the second component of the grounding nut.

It is a further object of the present invention to have a tightening screw inside the first component of the grounding assembly which retains the grounding wire. Prior to this invention, the grounding cable was stored outside of the stainless steel chamber. Therefore, it is a further object of the present invention to provide a penetrating pathway for the ultraviolet water sanitizer that includes a grounding assembly that is used to encase the grounding wire. The first and second components of the grounding assembly have hollow lumens or passages which provide an entry way or penetrating pathway to receive a power cable with a grounding wire.

It is still a further object of the present invention to provide a more aesthetically pleasing and safe design of an ultraviolet water sanitizer. In order to meet safety standards, the ultraviolet water sanitizer has to be grounded. In prior applications, the grounding was placed on the outside of the chamber wherein the grounding nut was welded on the outer surface of the chamber and the grounding cable affixed to the grounding nut on the outside of the chamber. This design meets safety standards but has an undesirable problem of requiring the grounded nut to be affixed or welded to the outside of the stainless steel chamber. This increases the chances of leakage within the chamber during construction, increases construction time, and gives an appearance of a disorderly or unfinished product because of the exposed wire.

The above mentioned grounding construction keeps the grounding cable inside a waterproof assembly.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF EMBODIMENTS OF THE PRESENT INVENTION

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
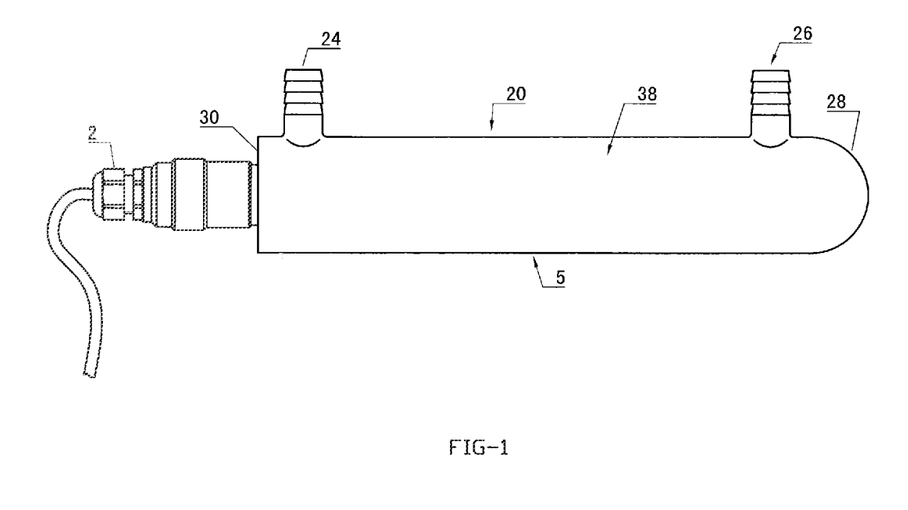
FIG. 1 is a side perspective view of the ultraviolet water sanitizer.
Figure 2:
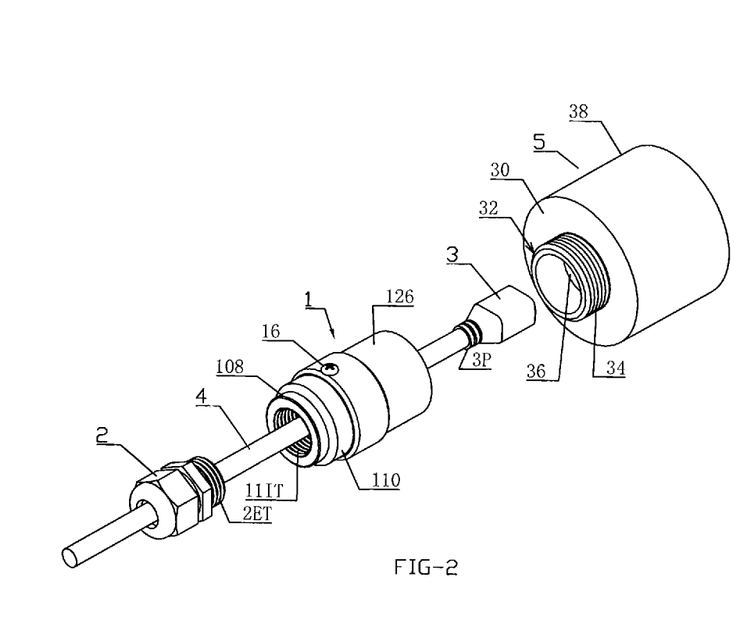
FIG. 2 is an exploded side perspective view of the grounding members for the electrical cable.

Referring to FIG. 1, there is illustrated an exterior side perspective view of the ultraviolet water sanitizer 20 including a stainless steel chamber 5, (it is also within the spirit and scope of the present invention for the chamber 5 to be made of any metal) having a water intake inlet 24 through which water to be sanitized flows into the ultraviolet water sanitizer 20 and a water exit outlet 26 through which water which has been sanitized by an ultraviolet lamp flows out of the ultraviolet water sanitizer 20. The stainless steel chamber 5 has a closed distal end 28. The stainless steel chamber 5 has an interior chamber 36 (see FIG. 2) with an ultraviolet lamp therein. Referring to FIG. 2, the stainless steel chamber 5 has a proximal wall 30 with an integral protruding coupling member 32 having exterior threads 34. The protruding coupling member 32 is hollow and leads to interior chamber 36 within stainless steel chamber 5. The interior chamber 36 also includes conventional items such as a ballast and a quartz sleeve. The ultraviolet lamp is connected with a lamp plug and then the ultraviolet lamp is inserted through an entry passage leading to interior chamber 36 and inserted into the quartz sleeve.

Figure 4:
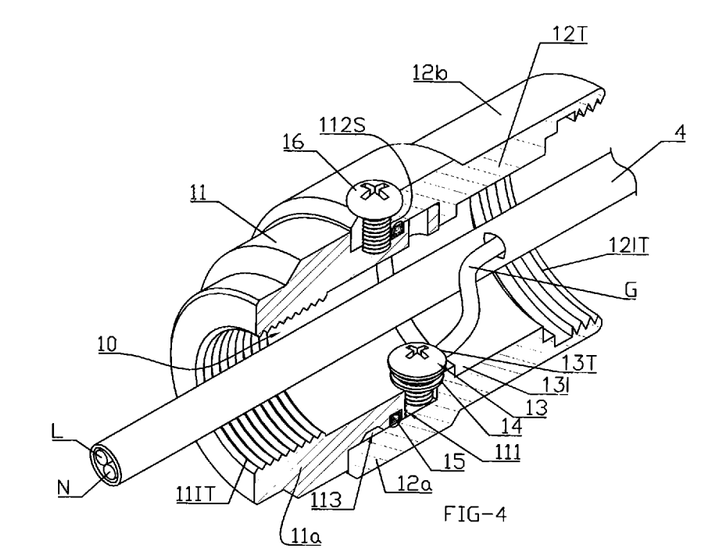
FIG. 4 is a cross-sectional view of a portion of the power cord, the first component of the present invention grounding member and the second component of the present invention grounding member.

A source of power, namely electricity, is used to power the ultraviolet lamp and other operating components within interior chamber 36. Referring to FIGS. 2 and 4, a power cord 4 has a pin connector 3 at a proximal end 3P which connects the power cord 4 to the ultraviolet lamp to power the ultraviolet lamp within interior chamber 36 of the present invention ultraviolet water sanitizer 20. The power cord 4 has an electrical plug (not shown) at its distal end (not shown), which electrical plug is connected to a source of electricity.

Figure 3:
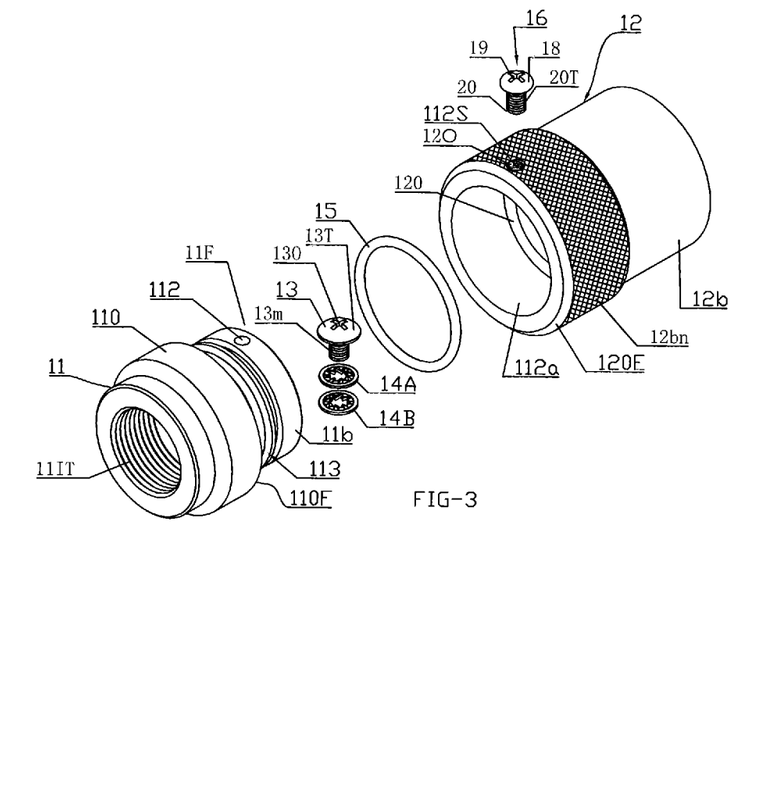
FIG. 3 is an exploded top and side perspective view of a portion of the power cord and the first component of the present invention grounding member illustrated 180 degrees out of alignment to be able to facilitate illustrating the threaded opening through which the grounding bolt is threaded, and the second component of the present invention grounding member, with the grounding bolt and the second component drawn in correct alignment.

The present invention power cord grounding assembly 1 will now be described. Referring to FIGS. 2, 3 and 4, the grounding assembly 1 includes a first component 11 and a second component 12, which are removably connected as will be described. The first component 11 and the second component 12 can be taken apart to gain access to the grounding screw (or bolt) and grounding wire, if necessary. The first component 11 comprises a distal collar section 108 integral with a central collar section 110 having a front face 110F, an integral fluted or exterior grooved section 113 and a front interconnecting section 11b having a first interior wall 11a with a threaded external opening 112 with first female threads 112F in first interior wall 11a.

Figure 5:
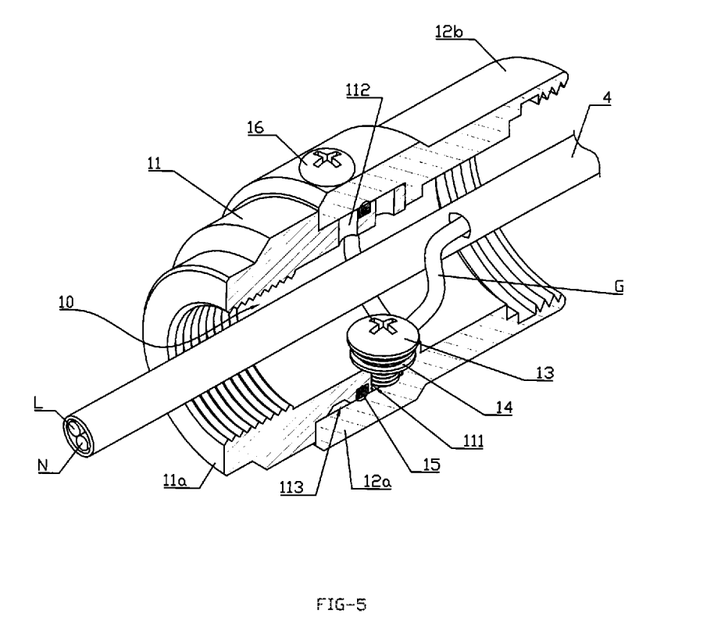
FIG. 5 is a close-up cross-sectional view of a portion of the power cord, the first component of the present invention grounding member and the second component of the present invention grounding member, and illustrating the grounding bolt and component joining bolt.

Referring to FIGS. 4 and 5, all collars of the first component 11 are hollow, providing a first entryway 10, also referred to as a penetrating way, to enable the power cable 4 and connecting pin 3, to pass through first component 11. This interior of distal collar section 108 has mating threads MT which can be female threads. Illustrated in FIG. 2, a waterproof strainer 2 has mating threads 2ET, which can be male threads, to threadedly fasten the waterproof strainer 2 to distal collar section 108 of first component 11. Threads 2ET are threaded into threads 11IT. The power cable 4 also passes through the interior of waterproof strainer 2.

Referring to FIGS. 3, 4 and 5, front interconnecting section 110 of first component 11 has grounding threads also called first section second interior mating transverse threads 111 which threadedly receive mating threads 13m of grounding bolt or screw 13. Referring to FIGS. 3 and 4, a pair of grommets 14A and 14B are also retained around mating threads 13m between the top 13T of grounding bolt 13 and within the area of the mating thread 13 and not reaching the bottom of the grounding bolt 13. The power cord 4 has a hot wire L, a neutral wire N, and a grounding wire G. A key component of the present invention is that the grounding wire G is retained between grommets 14A and 14B as grounding bolt 13 is threaded into second interior threads 111 of interior wall 11a of first component 11. The grounding bolt 13 is sufficiently short that it does not reach the interior wall 12a of second component 12. The grounding bolt 13 is threaded through a tool such as a screwdriver inserted into tool engaging opening 130 in top 13T. When the interior chamber or entryway 10 of the first component 11 is sealed, the ground wire or grounding wire G is safely retained within the waterproof connection within interior chamber or entryway 10 and is entirely within first component and is not within second component. Only the bottom of the grounding bolt 13 is close to but does not fully touch the interior wall 12a of second component 12. For reference to FIG. 3, the second component 11 needs to be rotated 180 degrees so that the grounding bolt 13 is inserted into the opening 112 from the interior and ends adjacent the surface 11b of threaded opening 112.

Referring to FIGS. 3 and 4, the second component 12 has an exterior surface 12b which optionally has a knurled section 12bn. The second component 12 has a front portion 12T of internal wall 12a with interior mating threads 12IT which are sized to be threaded onto exterior threads 34 so that second component is threaded in a watertight manner onto stainless steel chamber 5. The second component 12 has an opening 12o in top surface 12b which extends into second interior wall 12a, the opening 12o extending into interior threads 112S. The proximal section 11b of first component 11 is inserted into interior chamber 111a with gasket 15 retained between interior wall 120 and front wall 11F of first component 11. First threaded bolt or screw 16 has exterior threads 20T on threaded shaft 20 which match threads 112S. First threaded bolt or screw 16 has a top 18 with a tool receiving portion 19 to receive an affixing tool such as a screwdriver and threads 20T on threaded shaft 20 with threads 20T to fit into second section first threaded hole 120 and threads 112S. The bottom of bolt 16 is press fit retained against threaded groove section 113 of first component 11. Therefore, the first threaded bolt 16 does not enter the first component 11 but is press fit retained against a portion of the exterior wall of first component 11. It is also illustrated in FIG. 3 that threaded shaft 20 retains second component 12 to first component 11 by first threaded screw 16. In one or several applications, the first threaded screw 16 not only affixes the first component 11 to second component 12 of the grounding assembly, but also increases the grounding capability.

Referring to FIG. 2, the above-described mentioned grounding construction keeps the grounding cable inside the grounding assembly 1. The ultraviolet water sanitizer is grounded by connecting the grounding wire G nut within the present invention grounding assembly 1 nut. When this invention is utilized with the ultraviolet water sanitizer, the final product looks clean and simple and it is more safe in application. In addition, two-part construction is easy for production and grounding operation.

Referring again to FIG. 3, there is a gasket ring 15 on first component 11 that provides a seal between the outside of first component 11 and second component 12. The diameter of central part 110 of first component 11 is the largest diameter on first component 11. Central part 110 has a front face 110F that matches flush with end face 120E when first component 11 and second component 12 are affixed together.

As illustrated in FIG. 5, in order to facilitate production and grounding application, grounding cable G is affixed in between first grommet 14a and second grommet 14b. Ground cable G is retained from movement by the tightening of grounding screw 13 into threaded grounding hole 111.

Therefore, the first component 11 and second component 12 are affixed together and the grounding wire is created in a completely sealed environment. The grooves 113 further enhance the watertight assembly.

While the present invention is being installed, the user removes grounding cable G from lamp power cord 4. Then the user can then cut the grounding cable G to a proper length and place it into penetrating interior chamber or wall 10. The grounding cable can then be affixed as discussed above. The ultraviolet water sanitizer is then grounded.

Defined in detail, the present invention is a grounding assembly to be used in conjunction with an ultraviolet water sanitizer (20), including a stainless steel chamber (5) having a closed distal end (28) and an interior chamber (36) with an ultraviolet lamp therein, a circumferential wall (38) encircling the interior chamber (36), a water intake inlet (24) extending through the circumferential wall (38) and into the interior chamber (36) and a water exit outlet (28) extending from the interior chamber (36) and through the circumferential wall (38), water to be sanitized flows into the interior chamber (36) through the water intake inlet (24) and water which has been sanitized by the ultraviolet lamp flows out of the interior chamber (36) through the water exit outlet (28), the stainless steel chamber (5) having a transverse proximal wall (30) with an integral protruding coupling member (32) having an exterior protrusion engaging member such as exterior threads (34), the integral protruding coupling member (32) is hollow and leads to the interior chamber (36), a power cord (4) having a pin connector (3) at a proximal end (3P) connected to the ultraviolet lamp, the power cord (3) connected at its distal end to a source of electricity, the power cord grounding assembly (1) comprising: (a) a first component (11) removably connected to a second component (12); (b) said first component (11) including a hollow distal collar section (108) integral with a hollow central collar section (110) having a front face (110F), an integral exterior grooved section (113) and a front interconnecting section (11b) with a threaded external opening (112) with first section internal mating threads (110F) in interior wall (11a, an interior of the hollow distal collar section (108) having mating female threads (11IT), a waterproof strainer (2) having mating male threads (2ET) to threadedly fasten the waterproof strainer (2) to the distal collar section (108); (c) a front interconnecting section (110) of the first component (11) having first section second interior mating threads (111) in interior wall (11a), the first section second interior mating threads (111) receive mating threads (13m) of a grounding bolt (13), a pair of spaced apart grommets (14A and 14B) retained around the mating threads (13m) of the grounding bolt (13); (d) said power cord (4) having a hot wire (L), a neutral wire (N), and a grounding wire (G), the grounding wire (G) in the first component (11) with the grounding wire (G) retained between the pair of grommets (14A and 14B) of the grounding bolt (13), the grounding bolt (13) retained into the first section second interior mating transverse threads (111) of the interior wall (11a) of the first component (11); (e) said second component (12) having an exterior surface (12b) with an interior wall 12(a) including an interior wall portion 12T having a coupling engaging member such as interior threads (12IT) retained onto the engaging member such as male threads (34) of the coupling member (32) of said stainless steel chamber (5), the second component (12) having an opening (12o) in a top surface (12b) which extends into second section interior transverse threads (12IT) in interior wall (12a), the second component (12) interior transverse threads (12IT) match interior transverse mating threads (112F) of the first component (11), a proximal section (11b) of the first component (11) retained between the front wall (11F) of the first component (11) and an interior wall (120) within rear interior wall (112a) of second component (12), the first component (11) and the second component (12) retained together by a mating bolt (18) threaded through threadedly matched and aligned first section internal mating threads (110F) and second section interior transverse threads (12IT) so that said grounding wire's (G) is retained inside a combined closed chamber formed from retained first component (11) and second component (12), which second component (12) is then coupled to the stainless steel chamber (5). the grounding assembly (1).

Defined more broadly, the present invention is a grounding assembly to be used in conjunction with an grounding assembly to be used in conjunction with an ultraviolet water sanitizer including a metal chamber having a partially enclosed interior chamber with a water sanitizing ultraviolet lamp therein, a power cord connected at a proximal end to the ultraviolet lamp and connected at its distal end to a source of electricity, the power cord grounding assembly comprising: (a) a first component removably connected to a second component; (b) said first component including a first hollow collar having a distal end removably affixed to a closing member, the first hollow collar including a first internal wall having a first collar engaging area terminating in an exterior surface of the first hollow collar, the first hollow collar having first hollow collar interior chamber, the first hollow collar including a second grounding retaining member extending from the first hollow collar interior chamber into the first internal wall; (c) the second component including a second hollow collar having a second interior chamber bounded by a second wall having an exterior surface and an interior surface, a second collar engaging member terminating at its distal end at the exterior surface of the second hollow collar and terminating at its proximal end at a location where second engaging collar member joins the second interior chamber, an exterior portion of the first hollow collar inserted into an interior portion of the second hollow collar with the first collar engaging area aligned with the second collar engaging member, a collar retaining member removably press fit retaining the first component to the second component with the collar retaining member extending through the aligned second collar engaging member and press fit against the first collar engaging area, the first hollow collar interior chamber aligned with the second hollow collar interior chamber, the second component having a chamber engaging member to engage an engaging member of the metal cylindrical chamber leading to the partially enclosed interior chamber; and (d) the power cable extending through the aligned hollow interior chambers of the first hollow collar and second hollow collar with a neutral wire and live wire electrically connecting the ultraviolet lamp and a grounding wire retained by a grounding wire retaining member within the first hollow interior chamber and adjacent the interior surface of the first internal wall, with the grounding wire retained within the aligned hollow interior chambers and not exposed outside the first component and second component.

As discussed above, the grounding construction keeps the grounding cable G inside the grounding cable assembly 1. The ultraviolet water sanitizer is grounded by connecting the grounding nut within the present invention grounding assembly. When this invention is utilized with the ultraviolet water sanitizer, the final product looks clean and simple and it is more safe in application. In addition, two-part construction is easy for production and grounding operation.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. A grounding assembly to be used in conjunction with an ultraviolet water sanitizer, including a stainless steel chamber having a closed distal end and an interior chamber) with an ultraviolet lamp therein, a circumferential wall encircling the interior chamber, a water intake inlet extending through the circumferential wall and into the interior chamber and a water exit outlet extending from the interior chamber and through the circumferential wall, water to be sanitized flows into the interior chamber through the water intake inlet and water which has been sanitized by the ultraviolet lamp flows out of the interior chamber through the water exit outlet, the stainless steel chamber having a transverse proximal wall with an integral protruding coupling member having an exterior protrusion engaging member such as exterior threads, the integral protruding coupling member is hollow and leads to the interior chamber, a power cord having a pin connector at a proximal end connected to the ultraviolet lamp, the power cord connected at its distal end to a source of electricity, the power cord grounding assembly comprising:

a. a first component removably connected to a second component;

b. said first component including a hollow distal collar section integral with a hollow central collar section having a front face, an integral exterior grooved section and a front interconnecting section having a first interior wall with a threaded external opening with first section internal mating threads in a first interior wall, an interior of the hollow distal collar section having mating female threads, a waterproof strainer having mating male threads to threadedly fasten the waterproof strainer to the distal collar section;

c. a front interconnecting section of the first component having first section second interior mating transverse threads in its interior wall, the first section second interior mating threads receive mating transverse threads of a grounding bolt, a pair of spaced apart grommets retained around the mating threads of the grounding bolt;

d. said power cord having a hot wire, a neutral wire, and a grounding wire, the grounding wire in the first component with the grounding wire retained between the pair of grommets of the grounding bolt, the grounding bolt retained into the first section second interior mating transverse threads in the second portion of the interior wall of the first component;

e. said second component having an exterior surface with an interior wall including an interior wall portion having a coupling engaging member with interior threads retained onto the engaging member of the coupling member of said stainless steel chamber, the second component having an opening in a top surface which extends into second section interior transverse threads in the interior wall of the second component, a proximal section of the first component retained between the front wall of the first component and an interior wall within rear interior wall of said second component, the first component and the second component retained together by a mating bolt threaded through the second component and press fit retained against the front interconnecting section of the first component so that said grounding wire's is retained inside a combined closed chamber formed from retained first component and second component, which second component is coupled to the stainless steel chamber of said grounding assembly.

2. A grounding assembly to be used in conjunction with an ultraviolet water sanitizer including a metal chamber having a partially enclosed interior chamber with a water sanitizing ultraviolet lamp therein, a power cord connected at a proximal end to the ultraviolet lamp and connected at its distal end to a source of electricity, the power cord grounding assembly comprising:

a. a first component removably connected to a second component;

b. said first component including a first hollow collar having a distal end removably affixed to a closing member, the first hollow collar including a first internal wall having a first collar engaging area terminating in an exterior surface of the first hollow collar, the first hollow collar having first hollow collar interior chamber, the first hollow collar including a second grounding retaining member extending from the first hollow collar interior chamber into the first internal wall;

c. the second component including a second hollow collar having a second interior chamber bounded by a second wall having an exterior surface and an interior surface, a second collar engaging member terminating at its distal end at the exterior surface of the second hollow collar and terminating at its proximal end at a location where second engaging collar member joins the second interior chamber, an exterior portion of the first hollow collar inserted into an interior portion of the second hollow collar with the first collar engaging area aligned with the second collar engaging member, a collar retaining member removably press fit retaining the first component to the second component with the collar retaining member extending through the aligned second collar engaging member and press fit against the first collar engaging area, the first hollow collar interior chamber aligned with the second hollow collar interior chamber, the second component having a chamber engaging member to engage an engaging member of the metal cylindrical chamber leading to the partially enclosed interior chamber; and d. the power cable extending through the aligned hollow interior chambers of the first hollow collar and second hollow collar with a neutral wire and live wire electrically connecting the ultraviolet lamp and a grounding wire retained by a grounding wire retaining member within the first hollow interior chamber and adjacent the interior surface of the first internal wall, with the grounding wire retained within the aligned hollow interior chambers and not exposed outside the first component and second component.

\* \* \* \* \*